(12) United States Patent
Reial et al.

(10) Patent No.: US 12,096,342 B2
(45) Date of Patent: Sep. 17, 2024

(54) LIMITED CELL SEARCH MODE FOR WIRELESS DEVICES

(71) Applicant: Telefonaktiebolaget LM Ericsson (publ), Stockholm (SE)

(72) Inventors: Andres Reial, Höllviken (SE); Pradeepa Ramachandra, Linköping (SE); Ali Nader, Malmö (SE); Yutao Sui, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 529 days.

(21) Appl. No.: 17/290,002

(22) PCT Filed: Nov. 1, 2019

(86) PCT No.: PCT/EP2019/079998
§ 371 (c)(1),
(2) Date: Apr. 29, 2021

(87) PCT Pub. No.: WO2020/089468
PCT Pub. Date: May 7, 2020

(65) Prior Publication Data
US 2022/0345993 A1     Oct. 27, 2022

Related U.S. Application Data

(60) Provisional application No. 62/755,153, filed on Nov. 2, 2018.

(51) Int. Cl.
*H04W 48/16*      (2009.01)
*H04W 36/00*      (2009.01)

(52) U.S. Cl.
CPC ....... *H04W 48/16* (2013.01); *H04W 36/0058* (2018.08); *H04W 36/00835* (2018.08)

(58) Field of Classification Search
CPC ............. H04W 48/16; H04W 36/0058; H04W 36/00835; H04W 52/0235; H04W 24/10; Y02D 30/70
See application file for complete search history.

(56) References Cited

U.S. PATENT DOCUMENTS 8,989,674 B2 *   3/2015   Findlay ............. H04W 36/0088
                                                         370/464
2012/0300657 A1*  11/2012  Jung .................... H04W 24/10
                                                         370/252

(Continued)

OTHER PUBLICATIONS

International Search Report and Written Opinion dated Feb. 12, 2020 for International Application No. PCT/EP2019/079998 filed Nov. 1, 2019, consisting of 12-pages.

(Continued)

*Primary Examiner* — Justin Y Lee
(74) *Attorney, Agent, or Firm* — Weisberg I.P. Law, P.A.

(57) ABSTRACT

Methods and apparatuses are disclosed radio resource management (RRM) measurement. In one embodiment, a network node is configured to obtain neighbor relation information associated with a wireless device (WD) and/or a location of the WD; and determine whether to configure the WD in a limited search mode based on the obtained neighbor relation information. In another embodiment, the WD is configured to receive a configuration for a limited search mode; and perform measurements associated with neighboring cells based on the received configuration.

16 Claims, 11 Drawing Sheets

(56) References Cited

U.S. PATENT DOCUMENTS

2021/0211899 A1* 7/2021 Koziol .................. H04W 24/10
2021/0400508 A1* 12/2021 Ohara .................. H04W 24/08

OTHER PUBLICATIONS

3GPP TSG-RAN WG2 #102 Tdoc R2-1807143 (re-submission of R2-1805398); Title: Remaining Issues in inter-RAT measurements; Agenda Item: 10.4.1.4.5; Source: Ericsson; Document for: Discussion, Decision; Date and Location: May 21-25, 2018, Busan, S. Korea, consisting of 6-pages.

3GPP TSG RAN WG1 Meeting #94bis R1-1810988; Title: UE power Consumption Reduction in RRM Measurements; Agenda Item: 7.2.9.3; Source: OPPO; Document for: Discussion and Decision; Date and Location: Oct. 8-12, 2018, Chengdu, China, consisting of 4-pages.

3GPP TSG RAN WG1 Meeting #94bis R1-1811914; Title: Summary of UE power Consumption Reduction in RRM Measurements; Agenda Item: 7.2.9.3; Source: Vivo; Document for: Discussion and Decision; Date and Location: Oct. 8-12, 2018, Chengdu, China, consisting of 10-pages.

3GPP TS 38.213 V15.2.0; 3rd Generation Partnership Project; Technical Specification Group Radio Access Network; NR; Physical layer procedures for control (Release 15); Jun. 2018, consisting of 99-pages.

3GPP TS 38.331 V15.3.0; 3rd Generation Partnership Project; Technical Specification Group Radio Access Network; NR; Radio Resource Control (RRC) protocol specification (Release 15); Sep. 2018, consisting of 445-pages.

European Communication dated Apr. 3, 2023 for Application No. 19813238.3, consisting of 7 pages.

3GPP TSG-RAN2 Meeting #99 R2-1708273; Title: Relaxed monitoring in NB-IOT; Agenda Item: 9.13.3 Relaxed Monitoring for cell reselection; Source: Ericsson; Document for: Discussion and Decision; Location and Date: Berlin, Germany, Aug. 21-25, 2017, consisting of 10 pages.

* cited by examiner

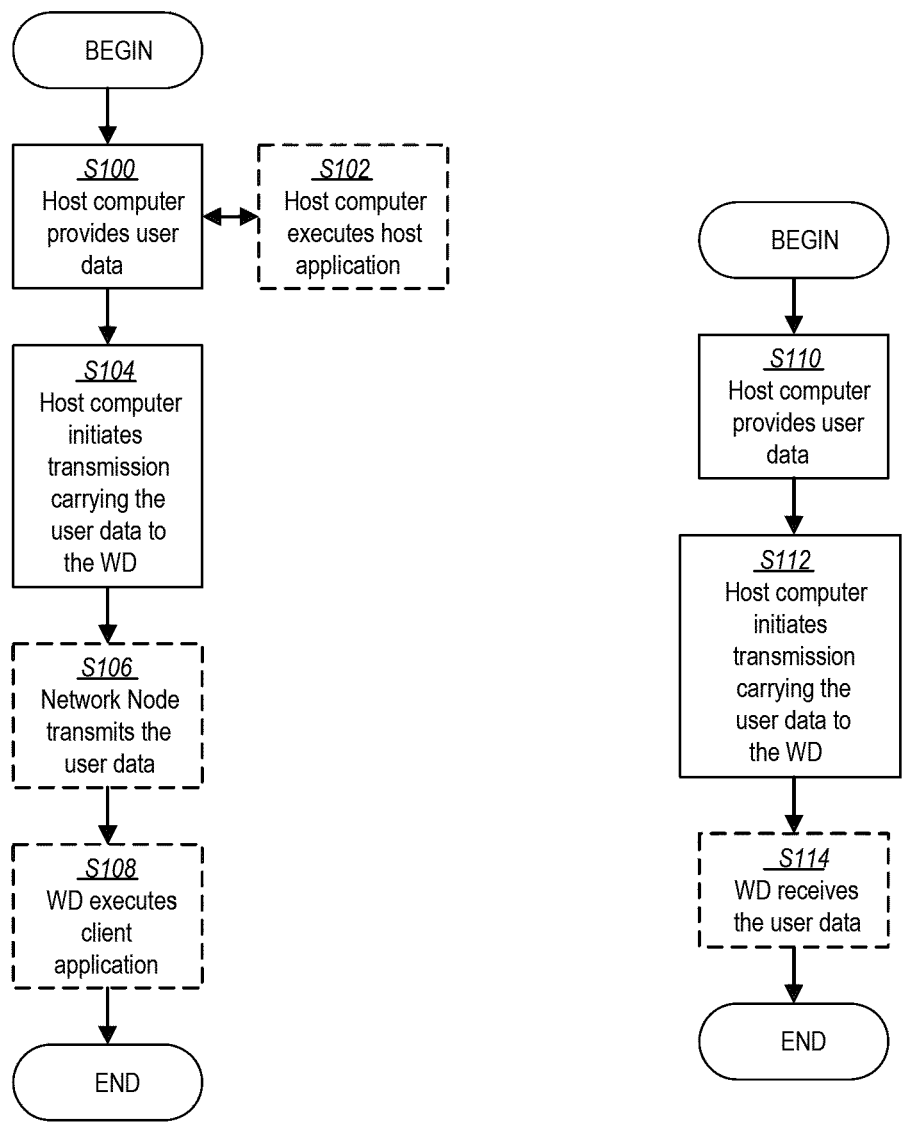

LIMITED CELL SEARCH MODE FOR WIRELESS DEVICES

CROSS-REFERENCE TO RELATED APPLICATIONS

This application is a Submission Under 35 U.S.C. § 371 for U.S. National Stage Patent Application of International Application No.: PCT/EP2019/079998, filed Nov. 1, 2019 entitled "LIMITED SEARCH MODE FOR WIRELESS DEVICES," which claims priority to U.S. Provisional Application No.: 62/755,153, filed Nov. 2, 2018, entitled "RADIO RESOURCE MANAGEMENT MEASUREMENT REDUCTION FOR WIRELESS DEVICES IN CONNECTED MODE," the entireties of both of which are incorporated herein by reference.

FIELD

The present disclosure relates to wireless communications, and in particular to cell search modes for a wireless device (WD) in connected mode.

INTRODUCTION

Radio technologies such as LTE (also referred to as "4G") and New Radio (NR) (also referred to as "5G") developed by the Third Generation Partnership Project (3GPP) can specify a number of radio resource control (RRC) states, or modes, including a connected mode, denoted RRC_CONNECTED mode.

One activity in RRC_CONNECTED mode may include monitoring the physical downlink control channel (PDCCH) for scheduled physical downlink shared channel (PDSCH) and radio resource management (RRM) measurements. Mobility measurements may be used to monitor whether a WD (e.g., user equipment (UE)) is connected to the best possible serving cell and evaluate candidates for handover (HO), e.g., in order to ensure timely HOs so that network node and link performance can be maximized. In frequency range (FR), both cell-level measurements may be used. In frequency range 2 (FR2) the number of beams to evaluate may be large (e.g., up to 64 per cell) and the radio frequency (RF) reception window may be longer to accommodate full beam sweeps. Therefore, RRM measurements may utilize extensive WD RF time and may be a significant contributor to the total energy consumption in a WD in many scenarios. Generally, the WD may be configured to perform measurements on all cells that the WD can find to ensure that new cells are found and fairly considered as HO candidates.

The time interval for when the WD should be performing RRM measurements may be configured using a synchronization signal block (SSB)-based measurement timing configuration (SMTC) window. The SMTC window may indicate which slots or parts of slots the WD should be collecting samples in so that relevant neighbor cells' SSBs will be detected.

Searching for new, previously unknown cells by the WD can amount to a cell search operation. In a typical New Radio WD implementation, this means that the primarily synchronization signal (PSS) detection is performed using a number of time/frequency (T/F) offset hypotheses according to assumed T/F misalignment limits.

The WD can report its measurement results to the network node, either periodically or event-based or as instructed by the network, e.g., when a serving cell quality drops below a threshold or a candidate cell quality metric exceeds that of the current serving cell by more than a threshold value. In a report, the WD may report up to 8 best cells according to a predetermined metric—reference signal received power (RSRP), reference signal received quality (RSRQ), signal-to-noise ratio (SNR), etc.

The RRM measurements to be performed by the WD, e.g., in NR can include both cell level and beam level measurements for serving cells and the neighbors in serving frequencies. The WD can be configured with up to 32 serving cells and the WD can be configured with up to 64 measurement objects (e.g., frequencies where the WD is to perform RRM measurements).

In order to perform RRM measurements in a given carrier/frequency/measObject, the WD may be configured with information related to where to find the SSBs in time and frequency. Such information may be provided in measObject for radio resource control (RRC)-connected WDs and in system information block 2/system information block 4 (SIB2/SIB4) for RRC idle/inactive WDs. The frequency location of the SSBs may be provided via ssbFrequency parameter in measObject. The time location of SSBs can be provided via SMTC windows. An SMTC window may include an indication of 3 parameters: window periodicity, window duration and window timing offset, as shown for example in FIG. 1.

The Information Element (IE) SSB-MTC may be used to configure measurement timing configurations, i.e., timing occasions at which the WD is to measure SSBs. An example of the IE SSB-MTC is as follows:

SSB-MTC Information Element

```
-- ASN1START
-- TAG-SSB-MTC-START
SSB-MTC ::=              SEQUENCE {
periodicityAndOffset         CHOICE {
sf5                      INTEGER (0..4),
sf10                     INTEGER (0..9),
sf20                     INTEGER (0..19),
sf40                     INTEGER (0..39),
sf80                     INTEGER (0..79),
sf160                    INTEGER (0..159)
},
duration                 ENUMERATED { sf1, s£2, sf3, sf4, sf5 }
}
SSB-MTC2 ::=             SEQUENCE {
pci-List                     SEQUENCE (SIZE (1..maxNrofPCIsPerSMTC)) OF PhysCellId
OPTIONAL, -- Need M
periodicity              ENUMERATED {sf5, sf10, sf20, sf40, sf80, spare3, spare2, spare1}
}
-- TAG-SSB-MTC-STOP-- ASN1STOP
```

| SSB-MTCfield descriptions |
| --- |
| duration<br>Duration of the measurement window in which to receive SS/PBCH blocks. It is given in number of subframes (see 38.213, section 4.1)<br>periodicityAndOffset<br>Periodicity and offset of the measurement window in which to receive SS/PBCH blocks. Periodicity and offset are given in number of subframes. FFS_FIXME: This does not match the L1 parameter table! They seem to intend an index to a hidden table in L1 specs. (see 38.213, section REF): Periodicity for the given PCIs. Timing offset and Duration as provided in smtc1.|
| SSB-MTC2 field descriptions |
| pci-List<br>PCIs that are known to follow this SMTC. |

As indicated above, the measurement report in NR may include both cell level and beam level measurements for serving cells, best neighbors in serving frequencies and also all the cells that triggered the measurement report (cells in the triggerdCellsList).

The network node can configure the WD as to whether it should include the best neighbor cell related measurements in the serving frequencies or not via a reportAddNeighMeas field. The network node can control whether the WD shall include the beam measurements or not use the includeBeamMeasurements flag in the reportConfigNR.

The network node can configure the WD as to whether the WD should include one or more of RSRP, RSRQ and signal-to-interference-and-noise ratio (SINR) for the cell level measurements via reportQuantityCell parameter in reportConfig. The network node can also configure the WD as to whether the WD should include one or more of RSRP, RSRQ and SINR for the beam level measurements or just the beam indexes via a reportQuantityRsIndexes parameter in reportConfig.

However, performing measurements, such as searching for neighbor cells can disadvantageously be energy intensive for a WD, for example due to the potentially high number of cells to search and/or the number of beams to evaluate for each cell.

SUMMARY

This disclosure provides techniques to reduce and limit measurements performed by the WD. In particular, some embodiments advantageously provide methods and apparatuses for reducing RRM measurements for a WD, e.g., on neighboring cells, by providing for a limited/no-search mode.

In one embodiment, a network node is configured to obtain neighbor relation information associated with a wireless device (WD) and/or a location of the WD; and determine whether to configure the WD in a limited search mode based on the obtained neighbor relation information.

In another embodiment, the WD is configured to receive a configuration for a limited search mode; and perform measurements associated with neighboring cells based on the received configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

DETAILED DESCRIPTION

Figure 1:
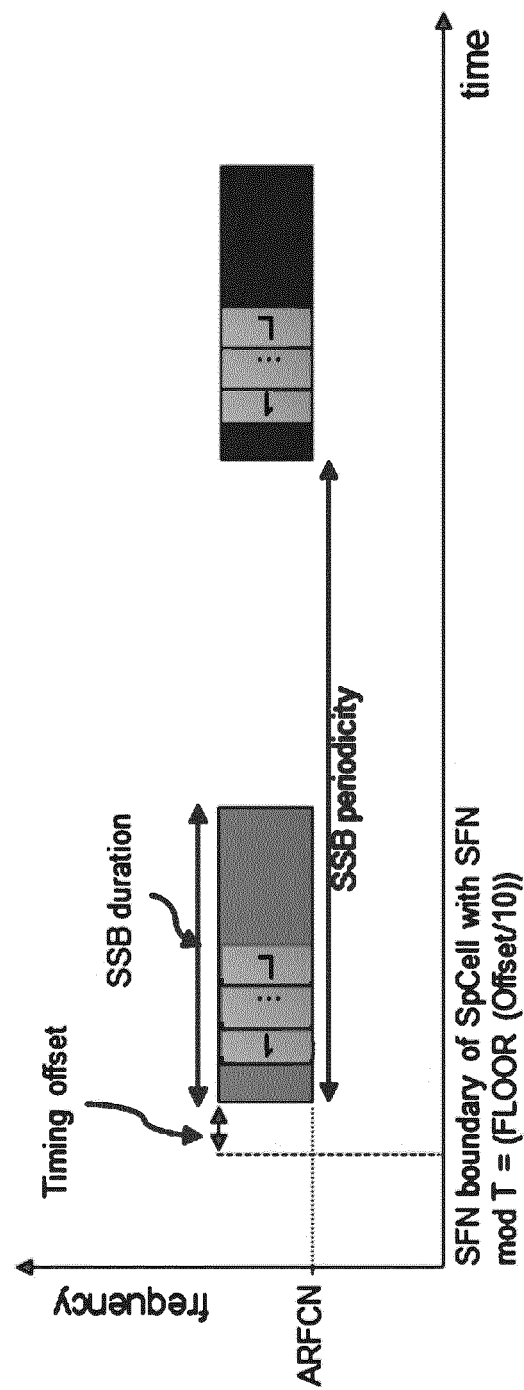
FIG. 1 illustrates an example of parameters for an SMTC window.

The number of RRM measurements to be performed by the WD can be significantly high in NR. For example, the WD can be configured with up to 64 measurement objects (with at least one SMTC window per measurement object) and the duration of each SMTC window can be up to 5 ms when many beams are used to provided SSB coverage, or when the network is not tightly synchronized or both. The WD may be expected to search for cells (those it has already measured and those it has not yet detected) when the WD opens its SMTC window.

When the WD performs RRM measurements to detect and measure new cells, the WD may generally use a maximum possible SMTC window span. However, in some cases, e.g. when the WD is static or slowly moving, much of the measurement will not reveal 'new' cells (e.g. cells not previously detected by the WD) but only re-measure the already-detected cells. The open-ended cell search efforts may therefore not be efficient, and the energy used for such measurements may be wasted. This may lead to an unnecessarily high WD energy consumption in the connected mode. Thus, this disclosure provides for an approach whereby the WD can reduce its RRM measurement effort, e.g., when no new cells are available to be detected.

In some embodiments of this disclosure, the network node may be configured to leverage the knowledge about its known neighbors and the neighbor cells about which the WD is aware in order to reduce the measurement overhead for the WD. The cells known to the network node may be those known from Automatic Neighbor Relation (ANR), a feature supported in NR in Release 15 of the 3GPP specifications. The network node may therefore have access to an ANR list of known neighbor cells.

In one embodiment of the disclosure, a network node corresponding to the source cell may check the measurement reports sent by the WD and determine if the cells reported by the WD include all (or a sufficient number of) cells in its neighbor list. The network node may use its previously-collected ANR information and the candidate cell measurement list reported by the WD to ascertain whether the WD has detected all (or substantially all) currently viable cells in the relevant part of the network (e.g. the serving cell, or e.g., parts of serving cell based on WDs position within the cell, etc.). The network node may then indicate to the WD that no new cell search should be performed for a predetermined or configured time.

Alternatively, or additionally, the network node may update the WD with a new/different SMTC configuration relevant for the remaining cells in the area (e.g., the WD may benefit from knowing that an SMTC with a shorter period is sufficient for finding the remaining cells). The WD may then limit its RRM measurement activity to updating quality metrics on already detected cells/beams, at known T/F offset locations, which may be performed without an open-ended search activity.

In one embodiment, the indication (e.g., the indication that no new cell search should be performed or of a new SMTC configuration) can be performed by the network node by signaling a new flag to the WD, e.g. via radio resource control (RRC) signaling, or medium access control (MAC) Control Element (CE).

In another embodiment, as part of the measurement configuration in measObejct, the network node may include a flag (e.g., reduceMeasurementOverheadFlag) to indicate that the cells configured in the cellsToAddModList for this measObject are the only cells that the WD should monitor. Such solution may provide the advantage that there a separate neighbor cell list may not be required (for the energy savings purposes) but rather allow a reuse of the neighbor cell list that is already provided under the current specification and also that the WD may not be required to search for more than these cells when the WD is connected to the serving cell that configured this measurement object. In further embodiments, the WD may simply reduce the cell detection periodicity upon the configuration of this flag (rather than simply not performing the cell search at all).

Some embodiments of this disclosure further provide procedures for returning to the full search mode and other aspects useful for implementing the method in practice.

Some embodiments of this disclosure provide for reducing the RRM activity for connected mode WDs in static scenarios where the new cells do not appear frequently. Advantageously, the techniques disclosed herein can reduce WD energy consumption.

Before describing in more detail exemplary embodiments, it is noted that the embodiments reside primarily in combinations of apparatus components and processing steps related to RRM measurement reduction for a WD in connected mode. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 2:
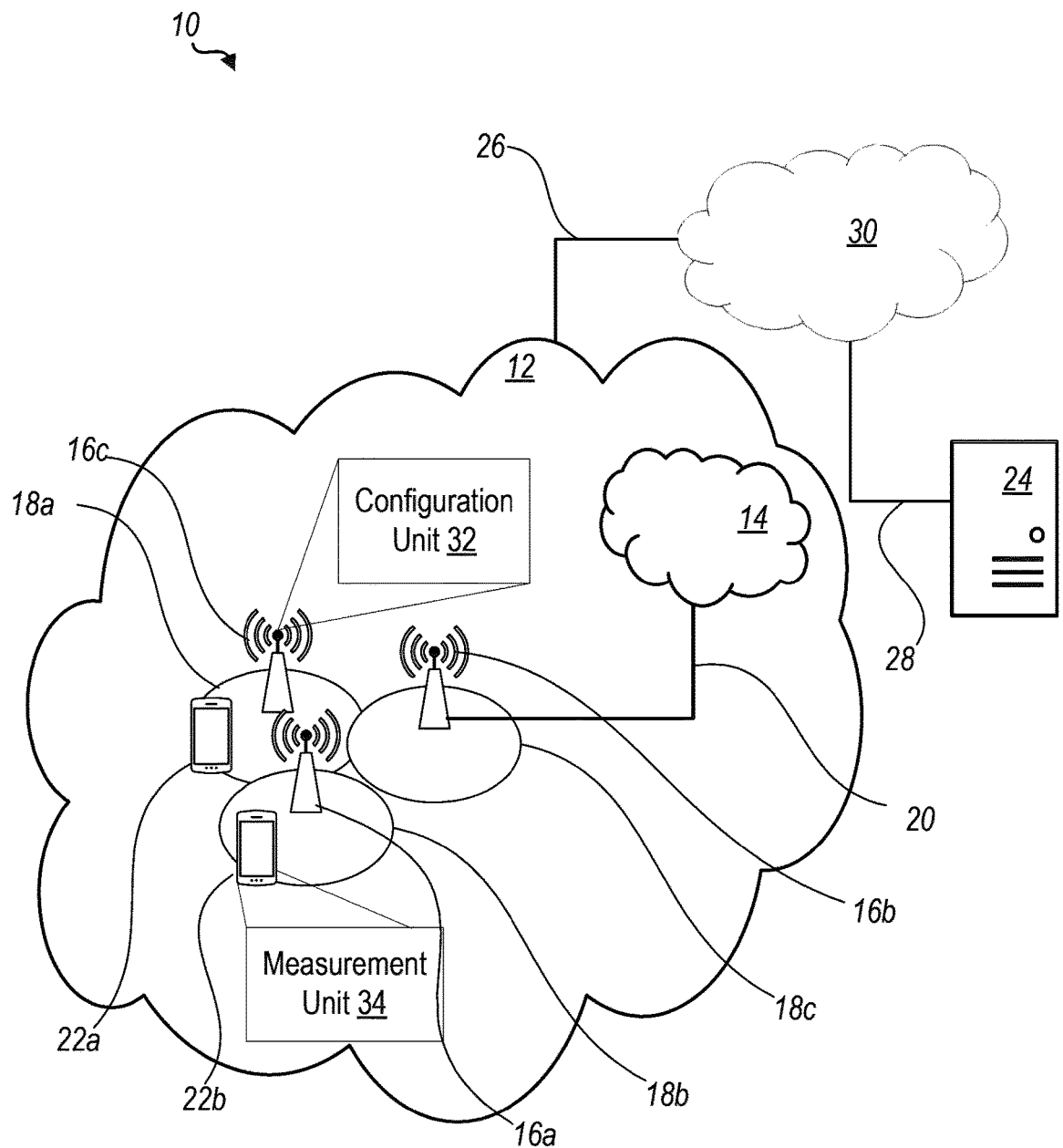
FIG. 2 is a schematic diagram of an exemplary network architecture illustrating a communication system connected via an intermediate network to a host computer according to the principles in the present disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so Referring now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to obtain neighbor relation information associated with the WD 22 and/or a location of the WD 22; and determine whether to configure the WD 22 in a limited search mode based on the obtained neighbor relation information.

A wireless device 22 is configured to include a measurement unit 34 which is configured to receive a configuration for a limited search mode; and perform measurements associated with neighboring cells based on the received configuration.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16.

The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to obtain neighbor relation information associated with the WD 22 and/or a location of the WD 22; and determine whether to configure the WD 22 in a limited search mode based on the obtained neighbor relation information.

In some embodiments, the processing circuitry 68, such as via the configuration unit 32, is configured to determine whether the WD 22 has reported all cells corresponding to the location of the WD 22; and one of configure and not configure the WD 22 in the limited search mode based on whether the WD 22 has reported all the cells corresponding to the location of the WD 22. In some embodiments, the limited search mode includes the WD 22 performing RRM measurements only on previously reported neighbor cells from the neighbor relation information. In some embodiments, the configuration of the WD 22 in the limited search mode includes signaling a flag indicating the limited search mode.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a measurement unit 34 configured to receive a configuration for a limited search mode; and perform measurements associated with neighboring cells based on the received configuration.

In some embodiments, the processing circuitry 84 is configured to perform the measurements, such as via the measurement unit 34, on only previously reported neighboring cells if the configuration indicates that the WD 22 is to enter the limited search mode; and perform an open-ended search for new cells if the configuration indicates the WD 22 is not to enter the limited search mode. In some embodiments, the received configuration for the limited search mode includes a flag in at least one of a radio resource control (RRC) message and a medium access control (MAC) control element (CE). In some embodiments, the processing circuitry 84, such as via the measurement unit 34, is further configured to report a ranking of the measurements associated with the neighboring cells.

Figure 3:
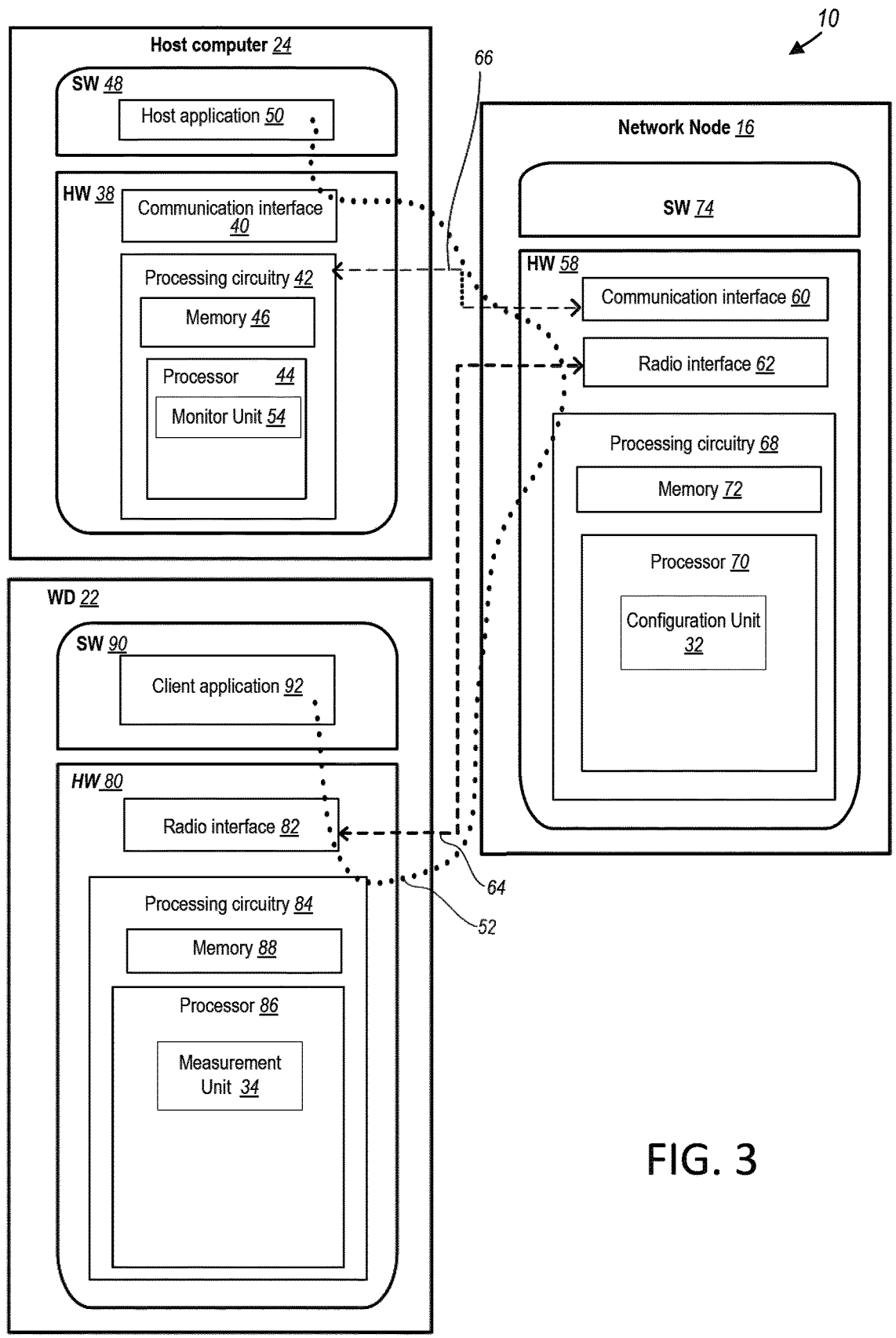
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as the configuration unit 32, and the measurement unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 5 is a flowchart illustrating an exemplary method implemented in a communication system, such as, for example, the communication system of FIG. 2 in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
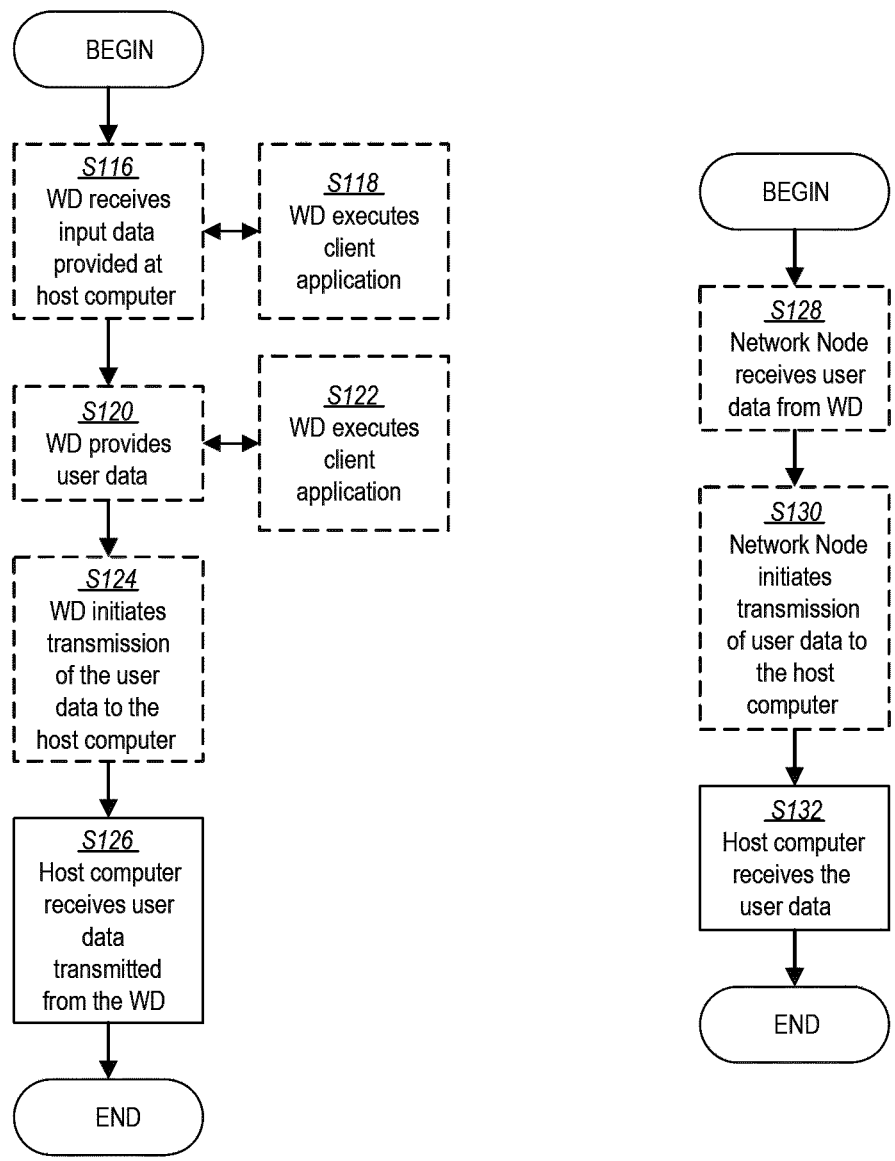
FIG. 6 is a flowchart illustrating exemplary methods implemented in a communication system including a host computer, a network node and a wireless device for receiving user data from the wireless device at a host computer according to some embodiments of the present disclosure.
FIG. 7 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Some exemplary processes according to the embodiments herein will now be described with reference to FIGS. 8 to 13.

Figure 8:
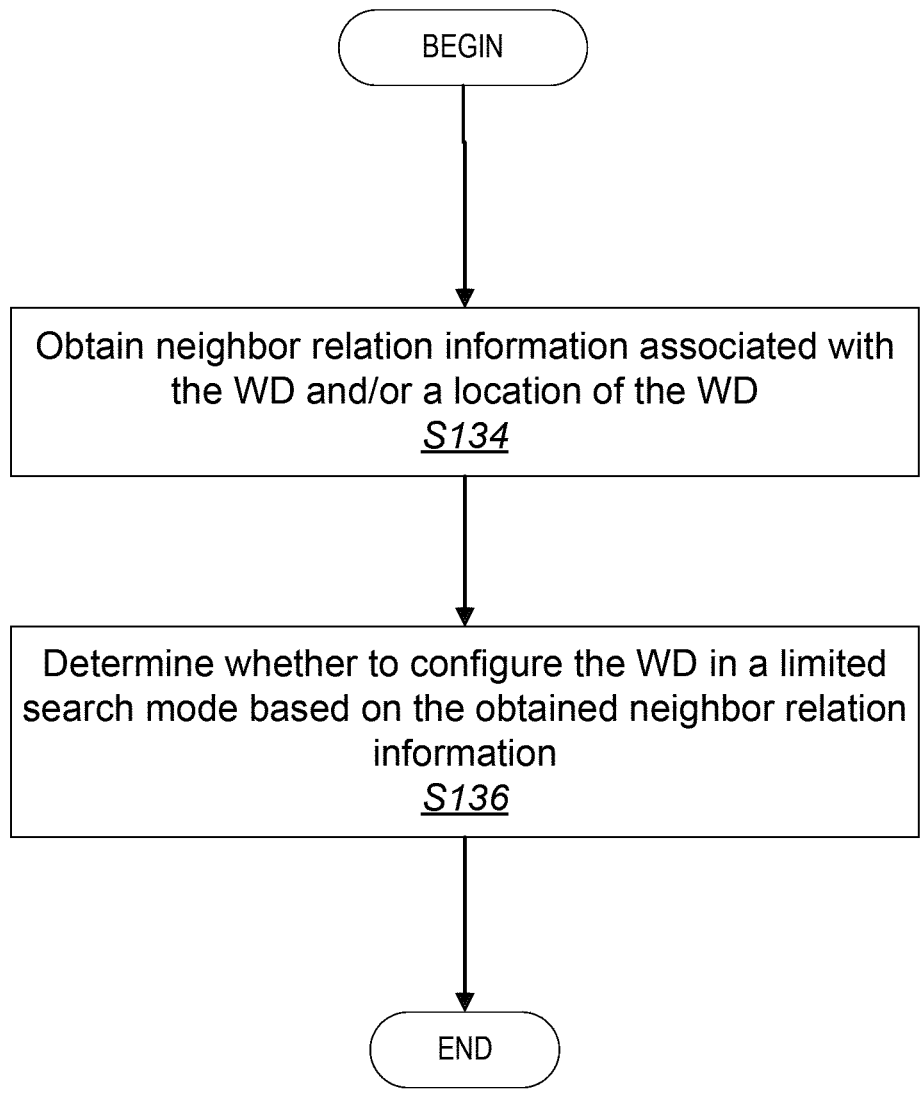
FIG. 8 is a flowchart of an exemplary process in a network node according to some embodiments of the present disclosure.

FIG. 8 is a flowchart of an exemplary process in a network node 16 for configuring the WD 22 according to some embodiments of this disclosure. One or more Blocks and/or functions and/or methods performed by the network node 16 may be performed by one or more elements of network node 16 such as by configuration unit 32 in processing circuitry 68, processor 70, radio interface 62, etc. According to the example method, which includes obtaining (Block S134), such as for example via the configuration unit 32, neighbor relation information associated with the WD 22 and/or a location of the WD 22. The method includes determining (Block S136), such as for example via the configuration unit 32, whether to configure the WD 22 in a limited search mode based on the obtained neighbor relation information.

In some embodiments, the method further includes determining whether the WD 22 has reported all cells corresponding to the location of the WD 22; and one of configuring and not configuring the WD 22 in the limited search mode based on whether the WD 22 has reported all the cells (e.g. all relevant cells as determined by the network node 16 according to this disclosure) corresponding to the location of the WD 22. In some embodiments, the limited search mode includes the WD 22 performing RRM measurements only on previously reported neighbor cells from the neighbor relation information. In some embodiments, the configuration of the WD 22 in the limited search mode includes signaling a flag indicating the limited search mode.

Figure 9:
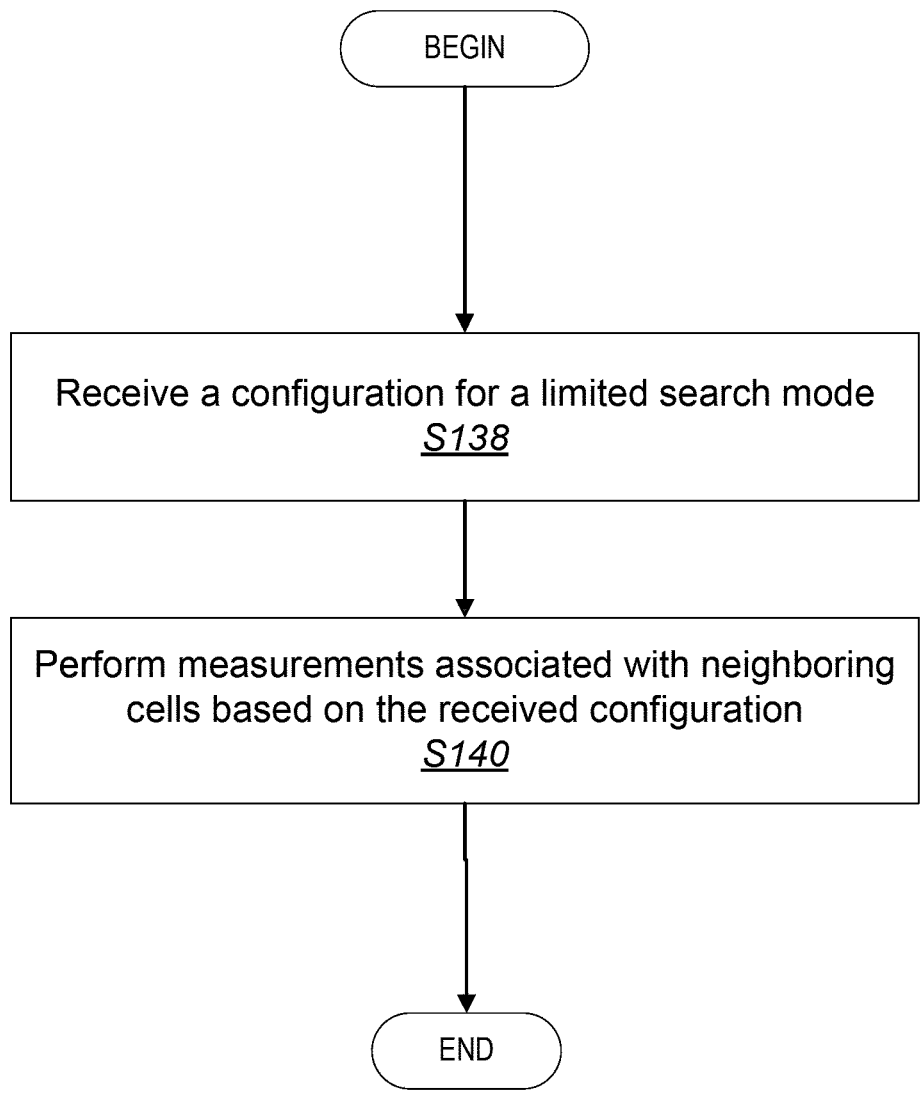
FIG. 9 is a flowchart of an exemplary process in a wireless device according to some embodiments of the present disclosure.

FIG. 9 is a flowchart of an exemplary process in a wireless device 22 according to some embodiments of the present disclosure. One or more Blocks and/or functions and/or methods performed by WD 22 may be performed by one or more elements of WD 22 such as by measurement unit 34 in processing circuitry 84, processor 86, radio interface 82, etc., which example method includes receiving (Block S138), such as for example via radio interface 82, a configuration for a limited search mode. The example method includes performing (Block S140), such as for example via the measurement unit 34, measurements associated with neighboring cells based on the received configuration.

In some embodiments, the method further includes performing, such as for example via the measurement unit 34, the measurements on only previously reported neighboring cells if the configuration indicates that the WD 22 is to enter the limited search mode; and performing, such as via the measurement unit 34, an open-ended search for new cells if the configuration indicates the WD 22 is not to enter the limited search mode. In some embodiments, the received configuration for the limited search mode includes a flag in at least one of a radio resource control (RRC) message and a medium access control (MAC) control element (CE). In some embodiments, the method further includes reporting, such as via the measurement unit 34 and/or radio interface 82, a ranking of the measurements associated with the neighboring cells.

Having generally described some embodiments for RRM for a WD 22 in connected mode that may advantageously reduce RRM activity and/or WD power consumption in certain modes, a more detailed description of some of the embodiments is described below.

Network Node Embodiments

Figure 10:
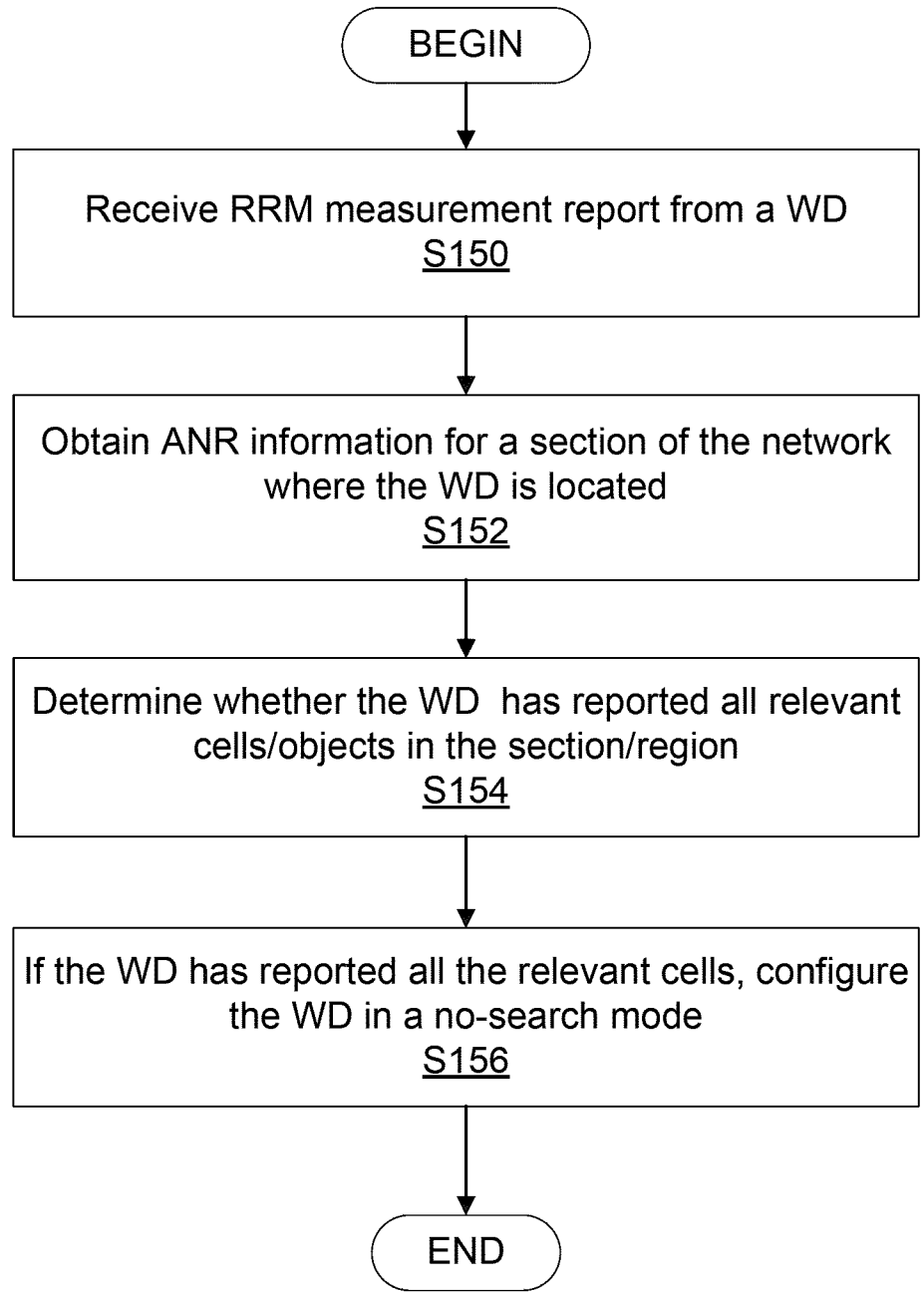
FIG. 10 is a flowchart of another example process for a network node according to some embodiments of the present disclosure.

A flow diagram of some embodiments of the disclosure for the network node 16 (e.g., gNB) is depicted in FIG. 10.

In Block S150, the network node 16 may receive periodic or event-triggered RRM measurement reports from a WD 22, e.g., up to 8 best cells allowed by the 3GPP Rel-15 NR specification. The reports may be received in a single occasion, or in multiple occasions over a predetermined time interval, e.g., seconds. The network node 16 may remember cells reported by the WD 22 in previous reports (e.g., obtain from its memory stored information indicating cells previously reported by the WD 22). The measurements could either be triggered based on traditional apriori-configured periodic/event-triggered configurations as currently in the specifications, or one-shot requests from network node 16 to derive which cells the WD 22 has currently found.

In Block S152, the network node 16 may retrieve ANR information for the part of the network node 16 where the WD 22 is located. The location may be defined based on the serving cell, part of the cell, the serving beam (if beam-level ANR is implemented), physical location, geographic location information, etc. The ANR information may be collected by the network node 16 e.g., based on previous RRM reports from many WDs 22 in the system and may indicate which cells can be detected by WDs 22 in the particular part of the network node 16.

In more detail, Automatic neighbor relation establishment is a self-organizing network (SON) feature that may be supported in NR rel-15. This procedure may be used to identify any unknown neighbor cell in the surrounding areas of a given source cell. In this procedure, the network node can request the WD to perform ab system information 1 (SIB1) reading of a neighbor cell and report the cellAccessrelatedInfo related parameters from SIB 1. The contents of cellAccessrelatedInfo can include a globally unique identity of the neighbor cell; thus, enabling the original source cell to identify the neighbor cell uniquely. An example of the contents of cellAccessrelatedInfo in Technical Specification 38.331 is given as follows:

CellAccessRelatedInfo Information Element

```
-- ASN1START
-- TAG-CELL-ACCESS-RELATED-INFO-START
CellAccessRelatedInfo ::=        SEQUENCE {
    plmn-IdentityList           PLMN-IdentityInfoList,
    cellReservedForOtherUse         ENUMERATED {true} OPTIONAL,   -- Need R
    ...
}
-- TAG- CELL-ACCESS-RELATED-INFO-STOP
-- ASN1STOP
```

PLMN-IdentityInfoList
Includes a list of PLMN identity information.

PLMN-IdentityInfoList Information Element

```
-- ASN1START
-- TAG-PLMN-IDENTITY-LIST-START
PLMN-IdentityInfoList ::=       SEQUENCE (SIZE (1..maxPLMN)) OF PLMN-IdentityInfo
PLMN-IdentityInfo ::=           SEQUENCE {
    plmn-IdentityList               SEQUENCE (SIZE (1..maxPLMN)) OF PLMN-Identity,
    trackingAreaCode                OPTIONAL, -- Need R
    ranac                       RAN-AreaCode    OPTIONAL,   -- Need R
    cellIdentity                ,
    cellReservedForOperatorUse      ENUMERATED {reserved, notReserved},
    ...
}
-- TAG-PLMN-IDENTITY-LIST-STOP
-- ASN1STOP
```

In another embodiment, historical reporting of the WD 22 within the area may be observed by the network node 16. This way, the ANR information may be adapted or filtered to be applicable to a specific WD's 22 behavior. For example, the ANR information in the area may include, e.g., 20 cells in one area, but a specific WD 22 may have never historically reported more than 15 of them (e.g., the 5 cells farther away or weaker than x dB may have never been historically reported by this particular WD 22). Based on this information in this example, only those 15 cells are assumed by the network node 16 to be relevant for that specific WD 22 in the area. In some embodiments, the "ANR information/list" discussed herein may be a WD-specific ANR information/list, even where not specifically mentioned.

In Block S154, the network node 16 determines whether all (or a considerable amount of) significant cells/beams in the ANR list for the WD 22 location have been reported by the WD 22. In some embodiments, this means that the WD 22 has found and reported all (or a considerable amount of) the cells in the neighborhood to be amongst the top-8 cells at least once during the report history.

Furthermore, the network node 16 may determine whether the ANR information is reliable and representative, i.e. properly describes the situation for the WD 22. For example, in some macro cell situations, a WD 22 in one "part of the cell" may not hear the cells from the other side of the cell, in which case the mechanism may not be enabled. On the other hand, in cases of small cells, the audibility may not be limited in different parts of the cell and the mechanism may be activated.

In Block S156, if the WD 22 has reported all relevant cells and/or the relevance assessment is deemed reliable, the network node 16 configures the WD 22 in a no-search mode. In some embodiments, the no-search mode may include skipping the open-ended search for new cells. The no-search mode, as used here, may, in some embodiments, refer to an operating mode where the WD 22 is not expected to search for additional cells beyond a list of already detected cells (e.g., the cells the WD 22 has already detected). Further, in some embodiments, the no-search mode may also include the WD 22 continuing to monitor and track T/F offsets of the previously detected cells.

In one embodiment, the indication or configuration of the WD 22 for the no-search mode may be performed by the network node 16 signaling a flag, or configuration to the WD 22, e.g., via RRC signaling, or MAC CE. Note that such flag/configuration can be used by the network node 16 to either enter and/or exit the no-search mode.

In addition, the network node 16 may also configure the WD 22 to report the signal strength of the cells it measures and/or to rank the reported cells accordingly. In some embodiments, if such ranking information does not change over a predetermined period of time, the network node 16 may configure the WD 22 in a no-search mode, e.g., to skip the open-ended search for new cells.

Also, the network node 16 can provide the WD 22 with an indication or instruction to monitor the signal strength of at least some selected cells that the WD 22 has detected (e.g., the network node 16 may also include the current cell the WD 22 is camp on or connected to). If the signal strength level remains for a predetermined/given period of time, the network node 16 may configure the WD 22 in a no-search mode, e.g., to skip open-ended search for new cells.

In some embodiments, the network node 16 can configure a length of the no-search mode, i.e., by a timer, or in terms of a number of radio frames, etc. Thus, the WD 22 may be mandated to perform the RRM measurements again after the time expires, and/or to report the results back to the network node 16. The network node 16 can then make a new decision about whether and how to configure the no-search mode.

Alternatively, or additionally, the WD 22 may exit the no-search mode when a configured measurement event (e.g., A1-6 events for intra) are triggered and a measurement report is sent to the network node 16.

In yet another embodiment, the network node 16 provides one or more thresholds (explicitly or implicitly) to the WD 22. Based on the threshold(s), the WD 22 may continue its reduced measurement activity until e.g., the serving cell's measurement quantity drops below the threshold level, for example.

In another embodiment, the network node 16 may utilize the knowledge about historical movement and RF characteristics of the WD 22 to e.g., determine whether the WD 22 should reduce its RRM measurement activity according to the techniques in this disclosure. Such information could either be provided by the WD 22 (e.g., the WD may indicate whether the WD 22 is stationary) or may be determined according to the WD 22 measurement capabilities. For example, different WDs 22 may have different RF characteristics and capabilities with respect to how far away cells are they can still find. Even if the WD 22 has not found all the cells relevant within a certain area, the network node 16 can, based on historical knowledge of the WD 22, derive (e.g., a likelihood of) whether the WD 22 would find all cells present in the network node's 16 ANR information/list. Based on this information, the network node 16 can relieve the WD 22 from excessive measurements according to the techniques in this disclosure, even if all possible cells in vicinity are not found by the WD 22 (e.g., since the network node 16 may determine that the particular WD 22 would not even be able to find certain far away cells present in the ANR list).

In some embodiments, the network node 16 may be configured to indicate to the WD 22 explicitly to return to the full measurement mode.

In some embodiments, during the no-search mode, the WD 22 may still be expected to monitor the signal quality of some cells/beams as indicated by the network node 16. If the quality of the cells/beams falls below some predetermined/given threshold(s), the WD 22 may be configured to exit the no-search mode e.g., automatically, and inform the network node 16. At the same time, the WD 22 can begin to search for new cells/beams, and include the results to the network node 16, so that the network node 16 can instruct the WD 22 accordingly.

The aforementioned thresholds could either be newly introduced absolute thresholds. Alternately, or in addition, the thresholds could be relative to the quality of the serving cell when entering the no-search mode. Yet another option may be that a potentially configured event, such as A2 (e.g., serving becomes worse than an absolute threshold), is used such that the threshold is set to the serving cell's quality level at the entering of the no-search mode. Upon triggering such event, a report may be sent to the network node 16 and the WD 22 may leave/exit the no-search mode. In alternative embodiments, the WD 22 may remain in the no-search mode and may wait for further commands from the network node 16 before exiting the no-search mode.

Additional or Alternative Network Node 16 Embodiment

In one embodiment, the indication, e.g., for no-search mode may be performed by the network node 16 using the existing ARN framework. For example, the indication may be performed using the reference to ARN list and existing RRM configuration mechanisms and parameters. One optional parameter that may be provided for the WD 22 as part of the neighbor cell information is the neighbor cell specific offsets (cellIndividualOffset, shown in italics in the code below) to be used for event triggering conditions/criteria for the techniques disclosed herein. For example, if the network has configured cellIndividualOffset for all the neighbors, then the network node 16 can inform the WDs 22 to look for only those cells listed as part of the CellsToAddModList in that frequency. This may assist the WDs 22 in scenarios where, for example, the network has a small number of neighbors and the network is fine with configuring cellIndividualOffset for each of these neighbors. For example, a flag 'reduceMeasurementOverheadFlag' may be used to activate (and/or deactivate) the reduction mechanism (bolded in the code below).

At block S160, the network node configures the WD 22 in a limited search mode. In this limited search mode, the WD 22 has a reduced cell measurement activity compared to when the WD is not in the limited search mode. Examples of reduced cell measurement activity have been provided above and include, for example: (i) not performing a search for 'new cells', in other words, limiting cell measurement activity to only monitoring those neighbor cells previously identified by the WD, e.g. those neighbor cells identified in the measurement report sent by the WD 22; (ii) performing cell detection measurements with a reduced periodicity compared to when the WD is not in the limited search mode (in other words, searching for new cells, but at a reduced periodicity); (iii) limiting cell measurement activity to only monitoring those neighbor cells indicated to the WD by the network node, for example the cells identified in an RRC message sent from the network node, such as the cells identified by the CellsToAddModList field.

```
MeasObjectNR ::=         SEQUENCE {
cellsToAddModList            CellsToAddModList      OPTIONAL, -- Need N
............
reduceMeasurementOverheadFlag   BOOLEAN            OPTIONAL, -- Need N
.......
}
CellsToAddModList ::=    SEQUENCE (SIZE (1..maxNrofCellMeas)) OF CellsToAddMod
CellsToAddMod ::=        SEQUENCE {
    physCellId           PhysCellId,
    cellIndividualOffset Q-OffsetRangeList
}
```

| CellsToAddMod field descriptions |
| --- |
| cellIndividualOffset<br>Cell individual offsets applicable to a specific cell.<br>physCellId<br>Physical cell identity of a cell in the cell list. |

| MeasObjectNR field descriptions |
| --- |
| reduceMeasurementOverheadFlag<br>A flag to indicate whether the WD need not search for cells other than the ones listed in CellsToAddModList. If this field is set to TRUE, the WD shall try to detect only those cells that are listed in CellsToAddModList and if this field is set to FLASE or if this field is not configured, then the WD shall try to detect all cells corresponding to this measObject. |

Notice that the reduceMeasurementOverheadFlag in the example above only indicates that when the WD 22 identifies some cells listed in the CellsToAddModList as a suitable cell for camping on (or that the WD 22 can be handed over to), the WD 22 may forego trying to detect all cells corresponding to the measObject. In the example above, if none of the cells are suitable, the WD 22 should fall back to the original behavior, e.g., to perform measurement and cell detection accordingly (e.g., full search mode).

In one embodiment, if none of the cells in the List fulfills the camp-on or handover criteria, i.e. if the WD 22 cannot find a suitable cell, even if this flag is set to true, the WD 22 may still try to detect other cells or other radio access technologies (RATs).

Figure 11:
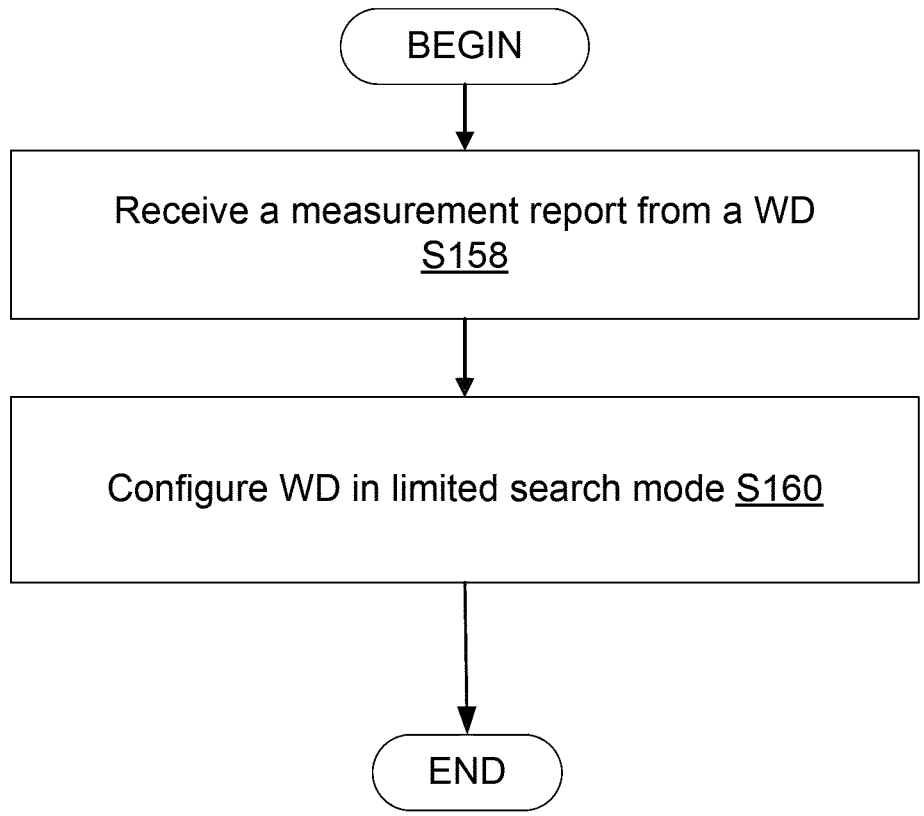
FIG. 11 is a flowchart of a further example process for a network node according to embodiments of the present disclosure.

A summary of the network node embodiments is depicted in FIG. 11. At block S158, the network node 16 receives a measurement report from the WD 22. The measurement report is of neighbor cell information, and in some examples described herein is an RRM measurement report.

As explained above, the network node might configure the WD to operate in the limited search mode when the measurement report (e.g. RRM measurement report) sent from the WD identifies substantially all cells for the WD's location within the network; in other words, when the measurement report identifies a number of cells for the relevant part of the network for the WD's location that exceeds a threshold. In some cases, the network node configures the WD to operate in the limited search mode when the measurement report identifies all relevant neighbor cells for the WD's location. The network node can determine whether to configure the WD to operate in the limited search mode using its knowledge of known neighboring cells, for example from the ANR information as described above. Knowledge of the neighboring cells known to the network node can be used to determine whether the measurement report from the WD identifies a sufficient (e.g. a number greater than a threshold) number of these cells to configure the WD to operate in the limited search mode.

The network node can configure the WD to operate in the limited search mode via a flag provided to the WD. An example of such a flag is the reduceMeasurementOverheadFlag described above.

WD Embodiment

Figure 12:
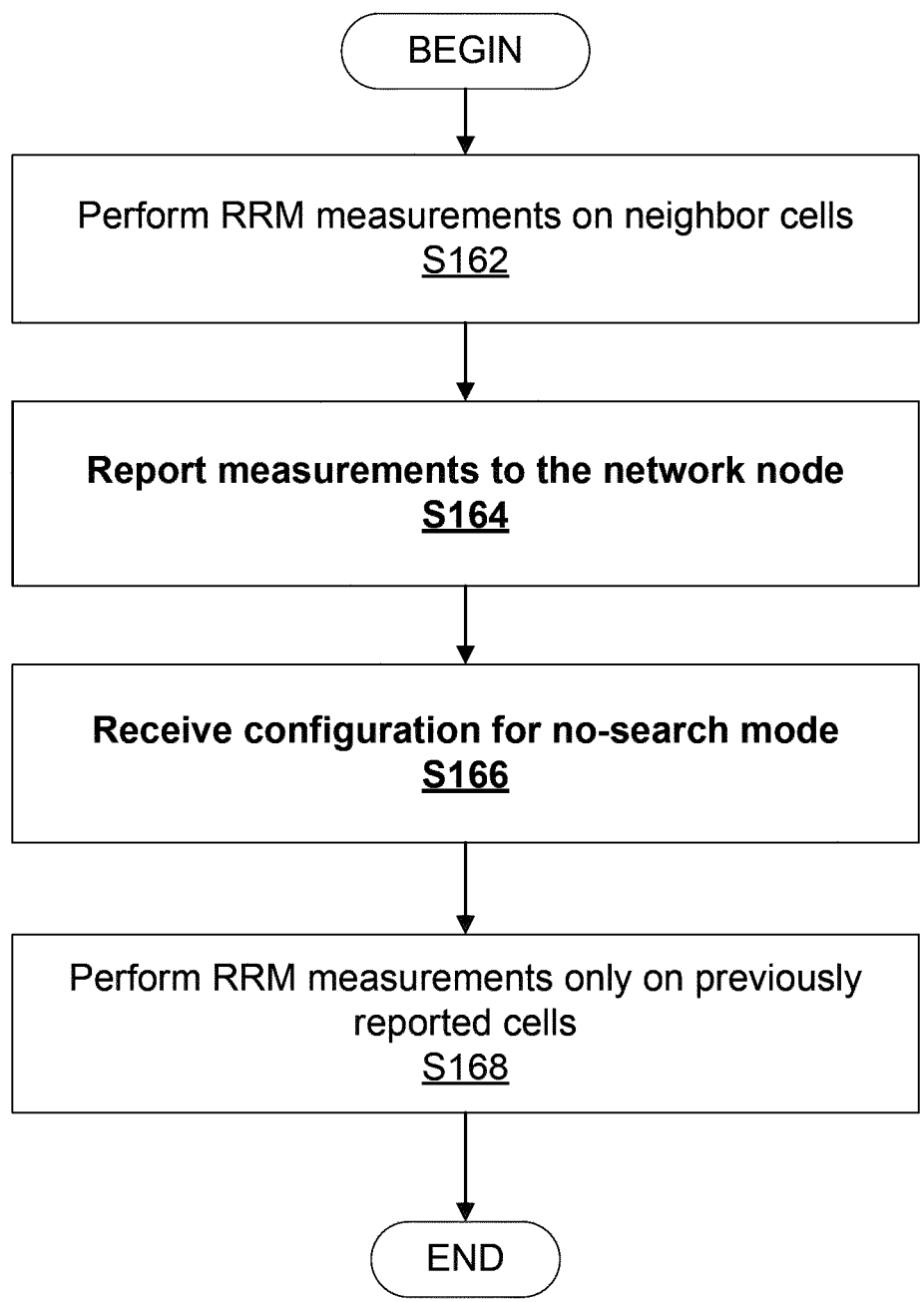
FIG. 12 is a flowchart of another example process for a WD according to some embodiments of the present disclosure.

A flow diagram for one embodiment at the WD-side is depicted in FIG. 12. Note that, in FIG. 12, steps with a corresponding network node flow (in FIG. 10) are indicated in bold. For example, receiving RRM measurement report from the WD 22 is Block S150 in FIG. 10 for the network-side; thus, the corresponding step on the WD-side of reporting the measurements to the network node 16 in FIG. 12 are bolded. Details in those steps are provided in the network-side description and therefore may not be described in great detail here, but may also apply to the embodiments for the WD 22 flow.

In Block S162, the WD 22 performs RRM measurements and in Block S164 the WD 22 may report a list of cells to the network node 16. The list of cells may be those cells with best quality metrics, based on the RRM measurements. In some embodiments, the list of cells may be performed e.g., according to a previous configuration or existing RRM measurement techniques (at least at an initial RRM measurement procedure).

In Block S166, the WD 22 receives a configuration from the network node 16 to perform measurements in a no-search mode, i.e., the limited or reduced monitoring mode described with reference to Block S156 and Block S160. In Block S168, the WD 22 may then perform RRM measurements, limited to the already found and reported neighbor cells. In one embodiment, the WD 22 omits time-domain correlation search for unknown PSS signals and only performs measurements for previously known cell signals (e.g., SSS and/or physical broadcast channel (PBCH) contents in a SSB) at known T/F offset locations.

Figure 13:
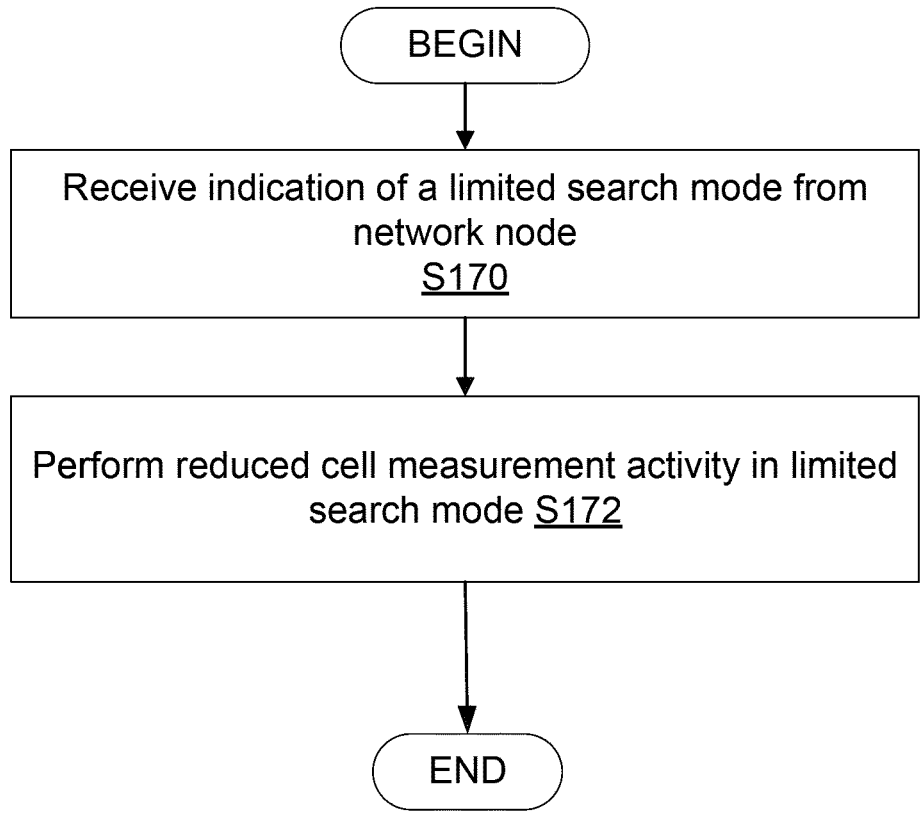
FIG. 13 is a flowchart of another example process for a WD according to embodiments of the present disclosure.

A summary of the WD embodiments is depicted in FIG. 13. At Block S170, the WD 22 receives from the network node 16 an indication of a limited search mode. As explained above, the indication might be in the form of a flag, for example a flag received in an RRC message. In one example, the flag is the reduceMeasurementOverheadFlag.

At Block S172, the WD 22 performs a reduced cell measurement activity in the limited search mode. Examples of the reduced cell measurement activity performed by the WD 22 are given above in relation to FIGS. 10 and 11 and so will not be repeated here.

As explained above with respect to the network node embodiments, the WD 22 can provide a measurement report of neighbor cell information to the network node 16 (e.g. an RRM measurement report). This measurement report can be used by the network node to determine whether to configure the WD in the limited search mode. In accordance with the examples described above, the network node 16 configures the WD 22 in the limited search mode when the measurement report identifies all or a substantial number of neighbor cells known to the network node (that is—when the number of identified neighbor cells exceeds a threshold). The threshold/number of cells might relate to the number of neighbor cells for a relevant part of the network, for example the part or region of the network associated with the WD's location. Thus, from the perspective of the WD 22, an indication of the limited search mode can be received from the network node 16 when the measurement report identifies all or a substantial number of relevant neighbor cells (that is, a number of cells exceeding the threshold).

Additional Aspects

For robustness, the WD 22 may remain in the no-search measurement state (i.e. limited search mode) for a limited time, or may be configured to periodically perform a full search. In some embodiments, the WD 22 may perform RRM measurements in the no-search mode for a predetermined amount of time, which predetermined amount of time may be configured by the network node 16, in some embodiments. In other embodiments, the WD 22 may perform the RRM measurements in the no-search mode until triggered by a condition, event, message, or other occurrence.

The above embodiments may also be part of SIB4, which may enable energy savings in idle/inactive mode. The embodiments described herein may also be applied to beams, instead of and/or in addition to its application to cells as described above. Measurements herein may be intra- or inter-frequency measurements.

Advantageously, in some embodiments, the approach in this disclosure may reduce cell level measurement overhead. To also reduce beam-level activity, if the cells have many SSBs (e.g., in mmW) the network node 16 may maintain beam-level ANR information.

Furthermore, the configurations described here can also be per tracking area. For example, if the WD 22 detects cells from a different tracking area than the WD 22 is currently assigned to, the WD 22 may report the information to the network node 16, and then the network node 16 may determine whether to configure the WD 22 to remain in the no-search mode (or a limited search mode). Because a WD 22 may move from a static state, to a mobile state, or leave a city via a highway or railway, these embodiments may be helpful in reducing wasteful WD energy consumption. The mobility handling requirements may change depending on the areas.

The techniques described in this disclosure may also be applied in idle/inactive modes, e.g., the network node 16 configuring the WD 22 in the no-search mode when transferring a formerly connected WD 22 to idle may provide criteria/conditions to the WD 22 for leaving the no-search mode and returning to the full search mode without further network node 16 interaction.

Assistance Data Aspects

In some embodiments, the WD 22 may further assist the network node 16 by indicating the WD's 22 mobility state (e.g., using signaling introduced in the RRC). For example, the WD 22 may indicate whether it is a WD 22 operating in high or low-mobility state. Such state could be based on the WD's 22 own knowledge, or alternately based on currently specified mobilityStateParameters e.g., as part of SIB2 configured by the network node 16. Alternately, or in addition, the network node 16 could determine the WD's 22 mobility based on historical information on the WD 22, and/or the WD 22 subscription information from the core network, and/or other parameters.

Yet another type of assistance could be provided by the WD 22 such as indicating to the network node 16 that the WD 22 has not found any new cells during a certain amount of time. The time window as such could either be pre-specified in the specifications in some embodiments, based on a multiple amount of SMTC periods, or potentially configured by the network node 16 earlier. After such indication from the WD 22, the network node 16 may use such indication/information to determine whether to allow the WD 22 to enter into a no-search mode and/or to remain in the no-search mode.

In some embodiments, the term "no-search mode" used herein may also include and/or be intended to indicate a reduced-search activity mode (that is, reduced, as compared with existing search modes/techniques). In other words, "no-search" may, in some embodiments, mean not searching for new neighbor cells, as well as, other reduced-searching techniques described herein. In other embodiments, the "no-search" may mean no-search at all for a predetermined period of time. In other embodiments, the "no-search" means to search only in previously reported cells based on a list of previously detected cells (e.g., no new cells). It should be understood that the techniques herein can be used to instruct the WD 22 to either stop searching for new cells and/or to reduce searching as compared to existing techniques, which may advantageously reduce RRM activity for the WD as compared to existing techniques. In some embodiments, the term "reduced search mode", "limited search mode" and "no-search mode" are used interchangeably.

In some embodiments, the techniques described herein may be used to reduce measurements taken by the WD in connected mode. In other embodiments, the techniques may be used to assist the WD with reducing its measurements in other modes, such as an idle mode. Also, any of the techniques described herein may be applied to beams instead of cells.

Even though the descriptions herein may be explained in the context of one of a Downlink (DL) (from network node to WD) and an Uplink (UL) (from WD to network node) communication, it should be understood that the basic principles disclosed may also be applicable to the other of the one of the DL and the UL communication. In some embodiments in this disclosure, the principles may be considered applicable to a transmitter and a receiver.

Any two or more embodiments described in this disclosure may be combined in any way with each other.

The term "resource", as used herein, is intended to be interpreted in a general way. It may indicate an arbitrary combination of subcarriers, time slots, symbols, codes and spatial dimensions.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, control information on one or more resources may be considered to be transmitted in a message having a specific format. A message may comprise or represent bits representing payload information and coding bits, e.g., for error coding.

An indication (e.g., an indication of limited/no-search/reduced mode, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns or sequences or a single bit or flag representing the information.

Configuring a radio node, in particular a terminal or WD (e.g., WD 22), may refer to the radio node being adapted or caused or set and/or instructed to operate according to the configuration (e.g., to perform measurements only on previously reported and/or known cells, beams, etc.). Configuring may be done by another device, e.g., a network node (e.g., network node 16) (for example, a base station or gNB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

ABBREVIATION EXPLANATION

3GPP 3$^{rd}$ Generation Partnership Project
5G 5$^{th}$ Generation
BB Baseband
BW Bandwidth
CDRX Connected mode DRX (i.e. DRX in RRC_CONNECTED state)
CRC Cyclic Redundancy Check
DCI Downlink Control Information
DL Downlink
DRX Discontinuous Reception
gNB A radio base station in 5G/NR.
HARQ Hybrid Automatic Repeat Request
IoT Internet of Things
LO Local Oscillator
LTE Long Term Evolution
MAC Medium Access Control
MCS Modulation and Coding Scheme
mMTC massive MTC (referring to scenarios with ubiquitously deployed
MTC devices)
ms millisecond
MTC Machine Type Communication
NB Narrowband
NB-IoT Narrowband Internet of Things
NR New Radio
NW Network
PDCCH Physical Downlink Control Channel
PDSCH Physical Downlink Shared Channel
RF Radio Frequency
RNTI Radio Network Temporary Identifier
RRC Radio Resource Control
RX Receiver/Reception
SSB Synchronization Signal Block
T/F Time/Frequency
TX Transmitter/Transmission
UE User Equipment
UL Uplink
WU Wake-up
WUG Wake-up Group
WUR Wake-up Radio/Wake-up Receiver
WUS Wake-up Signal/Wake-up Signaling It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings. Example embodiments of the present disclosure are provided below.

Embodiments

Embodiment A1. A network node configured to communicate with a wireless device (WD), the network node configured to, and/or comprising a radio interface and/or comprising processing circuitry configured to:

obtain neighbor relation information associated with the WD and/or a location of the WD; and determine whether to configure the WD in a limited search mode based on the obtained neighbor relation information.

Embodiment A2. The network node of Embodiment A1, wherein the processing circuitry is configured to:

determine whether the WD has reported all cells corresponding to the location of the WD; and one of configure and not configure the WD in the limited search mode based on whether the WD has reported all the cells corresponding to the location of the WD.

Embodiment A3. The network node of Embodiment A1, wherein the limited search mode includes the WD performing RRM measurements only on previously reported neighbor cells from the neighbor relation information.

Embodiment A4. The network node of Embodiment A1, wherein the configuration of the WD in the limited search mode includes signaling a flag indicating the limited search mode.

Embodiment B1. A method implemented in a network node, the method comprising: obtaining neighbor relation information associated with the WD and/or a location of the WD; and determining whether to configure the WD in a limited search mode based on the obtained neighbor relation information.

Embodiment B2. The method of Embodiment B1, further comprising: determining whether the WD has reported all cells corresponding to the location of the WD; and one of configuring and not configuring the WD in the limited search mode based on whether the WD has reported all the cells corresponding to the location of the WD.

Embodiment B3. The method of Embodiment B1, wherein the limited search mode includes the WD performing RRM measurements only on previously reported neighbor cells from the neighbor relation information.

Embodiment B4. The method of Embodiment B1, wherein the configuration of the WD in the limited search mode includes signaling a flag indicating the limited search mode.

Embodiment C1. A wireless device (WD) configured to communicate with a network node, the WD configured to, and/or comprising a radio interface and/or processing circuitry configured to:
receive a configuration for a limited search mode; and
perform measurements associated with neighboring cells based on the received configuration.

Embodiment C2. The WD of Embodiment C1, wherein the processing circuitry is configured to:

perform the measurements on only previously reported neighboring cells if the configuration indicates that the WD is to enter the limited search mode; and
perform an open-ended search for new cells if the configuration indicates the WD is not to enter the limited search mode.

Embodiment C3. The WD of Embodiment C1, wherein the received configuration for the limited search mode includes a flag in at least one of a radio resource control (RRC) message and a medium access control (MAC) control element (CE).

Embodiment C4. The WD of Embodiment C1, wherein the processing circuitry is further configured to report a ranking of the measurements associated with the neighboring cells.

Embodiment D1. A method implemented in a wireless device (WD), the method comprising:
receiving a configuration for a limited search mode; and
performing measurements associated with neighboring cells based on the received configuration.

Embodiment D2. The method of Embodiment D1, further comprising:
performing the measurements on only previously reported neighboring cells if the configuration indicates that the WD is to enter the limited search mode; and
performing an open-ended search for new cells if the configuration indicates the WD is not to enter the limited search mode.

Embodiment D3. The method of Embodiment D1, wherein the received configuration for the limited search mode includes a flag in at least one of a radio resource control (RRC) message and a medium access control (MAC) control element (CE).

Embodiment D4. The method of Embodiment D1, further comprising reporting a ranking of the measurements associated with the neighboring cells.

The invention claimed is:

1. A method implemented in a wireless device (WD), comprising:
receiving, from a network node, an indication of a limited search mode in which the WD performs a reduced cell measurement activity compared to when the WD is not in the limited search mode, the indication of the limited search mode received when the measurement report identifies a number of neighbor cells exceeding a threshold that are known to the network node and all neighbor cells known to the network node for the WD location; and
performing a reduced cell measurement activity in the limited search mode.

2. The method of claim 1, further comprising providing, to the network node providing a cell, a measurement report of neighbor cell information.

3. The method of claim 2, comprising performing a reduced cell measurement activity by only monitoring those neighbor cells identified in the measurement report.

4. The method of claim 1, wherein the indication is a flag received in a radio resource control (RRC) message.

5. The method of claim 1, wherein at least one of: the cell measurement activity is Radio Resource Management (RRM) measurement activity; the indication is received through RRM configuration parameters; and the measurement report is an RRM measurement report.

6. The method of claim 1, wherein neighbor cells known to the network node are known from automatic neighbor relation (ANR) information.

7. A wireless device (WD) configured to:
receive, from a network node, an indication of a limited search mode in which the WD performs a reduced cell measurement activity compared to when the WD is not in the limited search mode, the indication of the limited search mode received when the measurement report identifies a number of neighbor cells exceeding a threshold that are known to the network node and all neighbor cells known to the network node for the WD location; and
perform a reduced cell measurement activity in the limited search mode.

8. The wireless device of claim 7, wherein the wireless device is further configured to provide, to the network node providing a cell, a measurement report of neighbor cell information.

9. The wireless device of claim 8, wherein the WD is configured to perform the reduced cell measurement activity by only monitoring those neighbor cells identified in the measurement report.

10. The wireless device of claim 7, wherein neighbor cells known to the network node are known from automatic neighbor relation (ANR) information.

11. A method implemented in a network node providing a cell, the method comprising:
receiving a measurement report of neighbor cell information from a wireless device, WD; and
configuring the WD in a limited search mode in which the WD has a reduced cell measurement activity compared to when the WD is not in the limited search mode, the configuring the WD in the limited search mode being done when the measurement report identifies a number of neighbor cells exceeding a threshold that are known to the network node and all neighbor cells known to the network node for the WD location.

12. The method of claim 11, wherein the method comprises configuring the WD in the limited search mode in which the WD reduces cell measurement activity to only monitoring those neighbor cells identified in the measurement report.

13. The method of claim 11, wherein the method comprises configuring the WD in the limited search mode via a flag, in a radio resource control (RRC) message, indicating the limited search mode.

14. The method of claim 11, wherein the cell measurement activity is radio resource management (RRM) measurement activity and the method further comprises configuring the WD in the limited search mode through RRM configuration parameters, the measurement report being an RRM measurement report.

15. The method of claim 11, wherein neighbor cells known to the network node are known from automatic neighbor relation (ANR) information.

16. A network node providing a cell and configured to communicate with a wireless device (WD), the network node configured to:
- receive a measurement report of neighbor cell information from the WD; and
- configure the WD in a limited search mode in which the WD has a reduced cell measurement activity compared to when the WD is not in the limited search mode, the configuring the WD in the limited search mode being done when the measurement report identifies a number of neighbor cells exceeding a threshold that are known to the network node and all neighbor cells known to the network node for the WD location.

* * * * *